United States Patent [19]
Gabbe et al.

[11] Patent Number: 5,550,965
[45] Date of Patent: Aug. 27, 1996

[54] METHOD AND SYSTEM FOR OPERATING A DATA PROCESSOR TO INDEX PRIMARY DATA IN REAL TIME WITH ICONIC TABLE OF CONTENTS

[75] Inventors: John D. Gabbe, Little Silver; Allen Ginsberg, Jackson; Bethany S. Robinson, Colts Neck, all of N.J.

[73] Assignee: Lucent Technologies Inc., Murray Hill, N.J.

[21] Appl. No.: 173,843

[22] Filed: Dec. 27, 1993

[51] Int. Cl.[6] .................................................. G06F 15/00
[52] U.S. Cl. ...................... 395/154; 395/153; 395/159; 395/160; 395/161; 395/600
[58] Field of Search ................................. 395/153, 154, 395/160, 161, 159, 155, 600; 348/15, 19, 904; 358/335; 360/69

[56] References Cited

U.S. PATENT DOCUMENTS

| | | | |
|---|---|---|---|
| 4,750,213 | 6/1988 | Novak | 358/908 |
| 4,752,834 | 6/1988 | Koombes | 358/335 |
| 5,038,211 | 8/1991 | Hallenbeck | 348/460 |
| 5,107,343 | 4/1992 | Kawai | 358/335 |
| 5,157,511 | 10/1992 | Kawai et al. | 358/335 |
| 5,179,449 | 1/1993 | Doi | 358/335 |
| 5,189,630 | 2/1993 | Barstow et al. | 358/335 |
| 5,191,645 | 3/1993 | Carlucci et al. | 395/159 |
| 5,257,306 | 10/1993 | Watanabe | 348/15 |
| 5,321,396 | 6/1994 | Lamminy et al. | 340/825.49 |
| 5,343,251 | 8/1994 | Nafeh | 348/907 |
| 5,355,161 | 10/1994 | Bird et al. | 348/907 |
| 5,428,774 | 6/1995 | Takahashi et al. | 395/154 |

FOREIGN PATENT DOCUMENTS

0495622A3  7/1992  European Pat. Off. .
0507743A3  10/1992  European Pat. Off. .

OTHER PUBLICATIONS

Bimbo et al., "Sequence Retrieval by Contents Through Spatio Temporal Indexing", Proceedings 1993 IEEE Symposium on Visual Languages, pp. 88–92, Aug. 24, 1993.

Lamming, "Using Automatically Generated Descriptions of Human Activity to Index Multimedia Data", IEE Colloquium on Multimedia Comm. & App., pp. 5/1–3, Feb. 7, 1991.

Welch, "Fore Front Bringing Virtual Notebook to Mac", MacWeek, Aug. 23, 1993, v. 7, n. 34, p. 20(2).

Christodoulakis et al., "Browsing Within Time–Driven Multimedia Documents", Conf. on Office Information Systems, pp. 219–227, Mar. 23, 1988.

Little et al., "A Digital On–Demand Video Service Supporting Content–Based Queries", ACM Multimedia '93, pp. 427–436, Jun. 1993.

(List continued on next page.)

Primary Examiner—Mark K. Zimmerman
Assistant Examiner—Joseph R. Burwell

[57] ABSTRACT

A method and processing system for the indexing of data for one or more users involving the steps of receiving primary data, delineating episode data from the primary data, generating media representations to correspond with the episode data, generating a table of contents from the episode data and media representations in real time, and storing and/or presenting the table of contents on a graphical user interface. Primary data may constitute audio data, video data, text data, combinations of these as well as any medium-generated data which may be in or converted to digital form. Episode data is generated on the basis of significant video images determined by scene changes and other information. In addition, episode data may be based on a significant audio change, delineated from the primary data, e.g. based on speaker changes and other information. Media representations are iconic images, symbolic representations or graphical images which refer to episode data to ultimately aid the user in making decisions from reviewing the real time table of contents.

29 Claims, 11 Drawing Sheets

OTHER PUBLICATIONS

"Where Were We: Making and Using Nearsynchronous, Pre-narratative video," Scott L. Minneman and Steve R. Harrison, published in Multimedia 1993, pp. 5–6.

"A Magnifier for Tool for Video Data", Michael Mills, Jonathan Cohen and Yin Yin Wong, pubolished in May 3–7, 1992 issue of Proceedings of Computer Human Interaction, pp. 93–98.

"CECED: A System for informal Multimedia Collaboration", Earl Craighill, Ruth Lang, Martin, Fon, Keith Skinner, published in Proceedings of the Association for Computing Machinery Multimedia of 1993, p. 443.

"Video Conferecing file Storage and Management in Multimedia Computer Systems", P. Venkat Rangan, published in Computer Networks and ISDN Systems, Mar. 1993.

P. Venkat Rangan, "Video conferencing, file storage, and management in multimedia computer systems", *Computer Networks and ISDN Systems*, v. 25, pp. 901–919 (1993).

A. Nagasaka et al., "Automatic Video Indexing and Full–Video Search for Object Appearances", 1992, *Visual Database Systems II*, pp. 113–127.

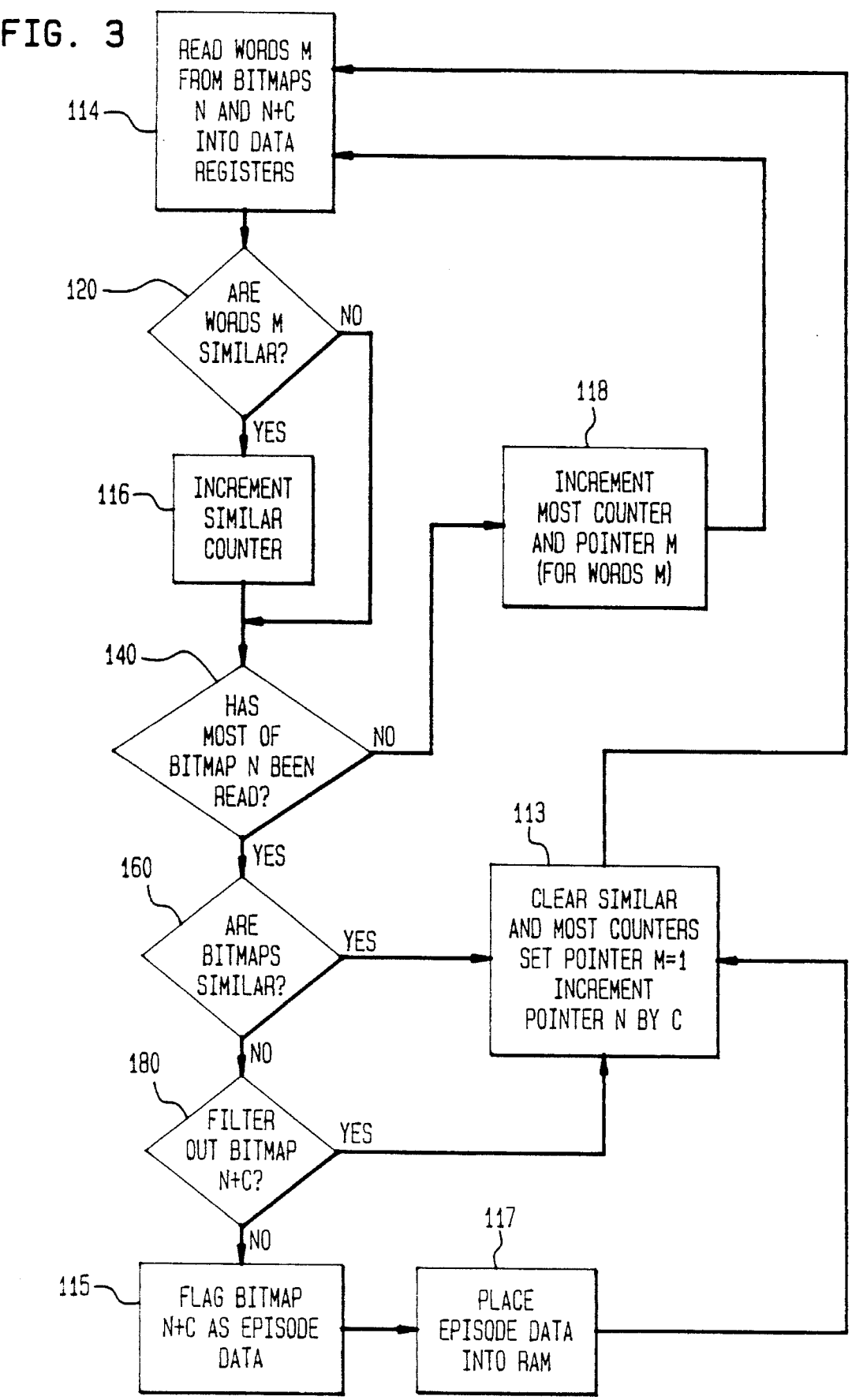

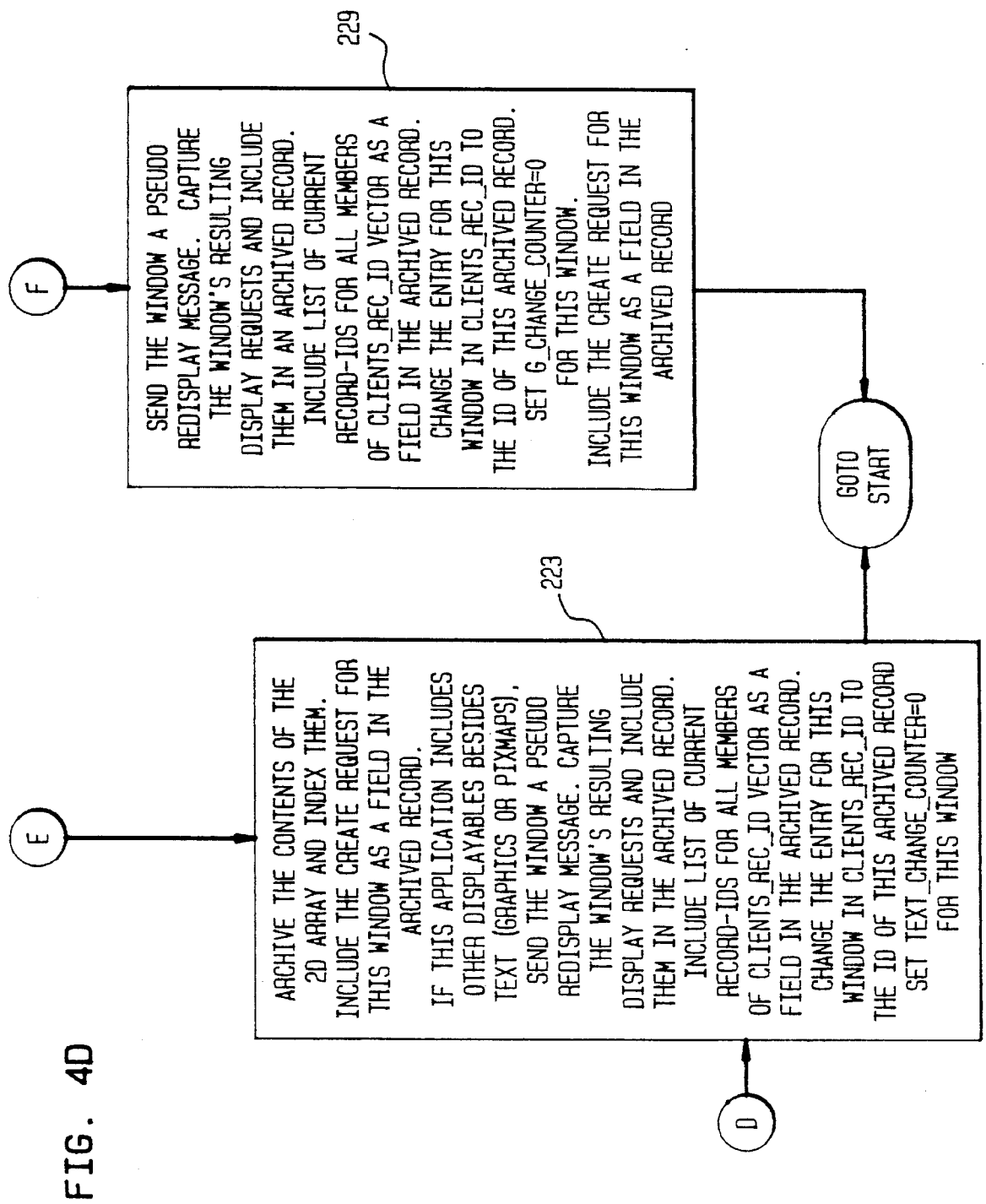

FIG. 5
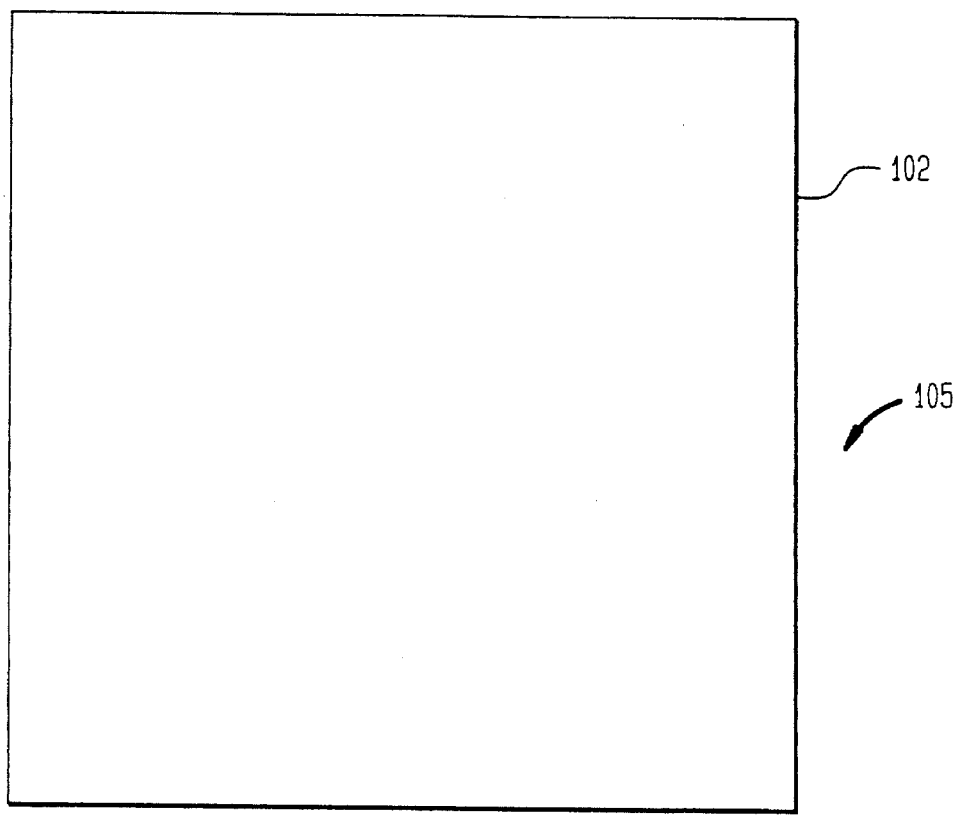
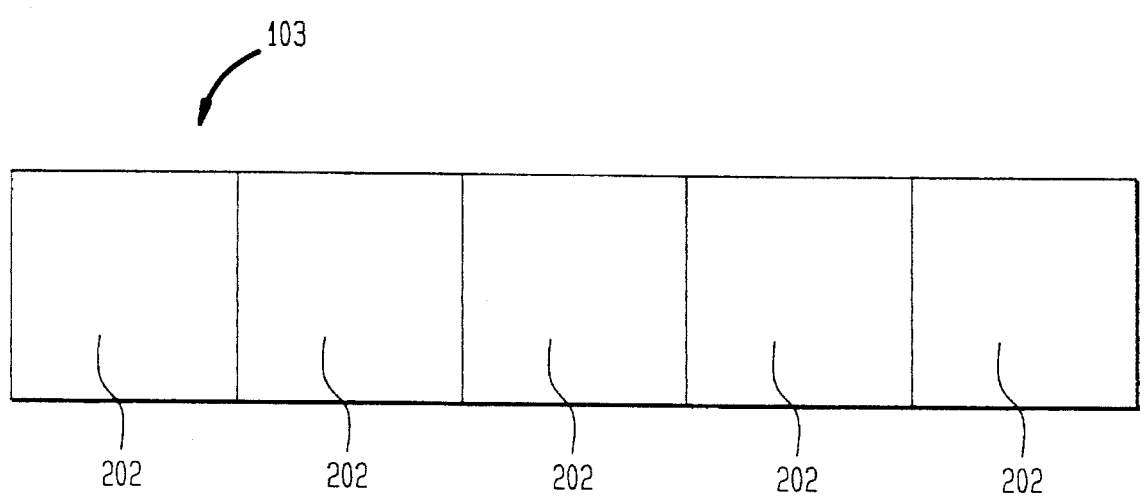

METHOD AND SYSTEM FOR OPERATING A DATA PROCESSOR TO INDEX PRIMARY DATA IN REAL TIME WITH ICONIC TABLE OF CONTENTS

BACKGROUND OF THE INVENTION

1. Field of the Invention

The present invention relates generally to methods for operating a processor to index data. More specifically, one aspect of the present invention relates to a method for real time generating of an iconic table of contents from raw audio data, video data, or other data.

2. Information Disclosure Statement

Generally, systems which allow a user to manually index digital video and audio data by textual annotation are known in the prior art. Systems which allow playback of digital video and audio data concerning a conference while recording said conference are also known in the prior art.

"Where Were We: Making and Using Near-synchronous, Pre-narrative Video," Scott L. Minneman and Steve R. Harrison, (Minneman) was published in *Multimedia* 1993, and discloses manual indexing of video and audio information through the use of complex computer hardware with high memory capacity. The Minneman system is one in which the user may manually select a video image and manually annotate the video image with text for subsequent use. Minneman discloses no intelligent agent for filtering significant occurrences on the video data.

"A Magnifier Tool for Video Data" (Mills) was written by Michael Mills, Jonathan Cohen and Yin Yin Wong and was published in the May 3–7, 1992 issue of the *Proceedings of Computer Human Interaction* on pages 93–98. Mills discloses a simplistic temporal index of video data which does not identify significant occurrences in the content of the video data but merely indexes video data by digitizing still frame samples at regular time intervals and does not appear to operate in real time because when the "Magnifier" program is initially entered six frames spanning the segments of an entire 30 minute presentation are illustrated.

"CECED: A System For informal Multimedia Collaboration" was written by Earl Craighill, Ruth Lang, Martin Fong, and Keith Skinner and published in *Proceedings of the Association for Computing Machinery Multimedia of* 1993. The Craighill publication discloses a "Process Manager which automatically collects, stores, and replays design traces that were generated during a single user or multiparty design session and only allows the user to select and annotate significant occurrences in the process trace after playback.

"Video Conferencing File Storage and Management in Multimedia Computer Systems" was written by P. Venkat Rangan in *Computer Networks and ISDN Systems*, March 1993, pp. 901– 919. The Rangan article discloses a video conferencing system which allows the user to playback a recorded conference while the real time conference is continuing. The Rangan article discloses a Video File Server that allows a user-participant in a conference to manually record the proceedings of a conference into a document and the Video File Server stores the video associated with the document in a textual file. However, the Video File Server does not automatically filter important occurrences and does not create a table of contents or index based thereon.

SUMMARY OF THE INVENTION

The present invention is a method of operating a data processor, or plurality of data processors, to index data for one or more users involving the steps of receiving primary data, delineating episode data from the primary data, generating media representations to correspond with the episode data, generating a table of contents from the episode data and media representations in real time, and storing and/or presenting the table of contents on a graphical user interface. Primary data may constitute audio data, video data, text data and combinations of these as well as any medium-generated data which may be in or converted to digital form. Episode data is generated on the basis of significant video images determined by scene changes and other information. In addition, episode data may be based on a significant audio change, delineated from the primary data, e.g. based on speaker changes and other information. Media representations are iconic images, symbolic representations or graphical images which refer to episode data to ultimately aid the user in making decisions while reviewing the real time table of contents.

BRIEF DESCRIPTION OF THE DRAWINGS

The present invention may be understood by reference to the following description considered in conjunction with the following accompanying drawings, in which like reference numerals identify like elements, as follows:

FIG. 3 is a flowchart depicting the data flow regarding the step of delineating episode data according to the present invention.

FIGS. 4A–4D are flowcharts depicting the step of filtering event data according to the present invention.

FIG. 5 is a diagram illustrating the step of presenting the table of contents by showing one possible screen configuration on the video display device according to the present invention.

DETAILED DESCRIPTION OF THE PRESENT INVENTION

Figure 1:
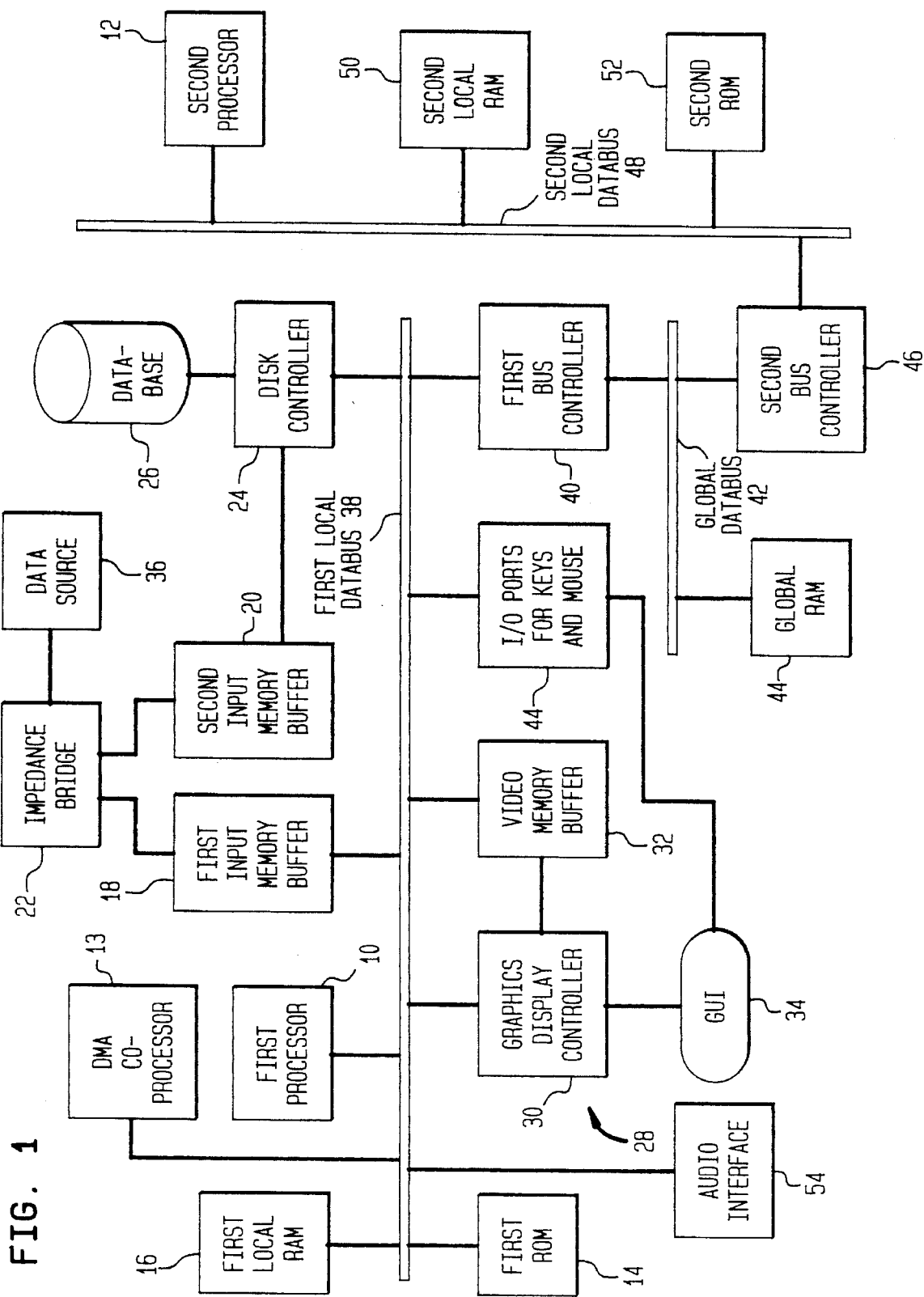
FIG. 1 shows one possible hardware configuration for implementing the present invention.

The present invention is directed to providing a method for automatically indexing data such that a user will not be required to peruse the contents of the data and/or manually index data. The method includes real time generation of a table of contents of video, textual, audio, and other available information which is analogous to the table of contents in a book. The method of the invention will improve the utility of information storage and retrieval systems by associating ancillary data which can be understood by processing systems, with multimedia data which is presently incomprehensible to processing systems.

The present invention method is also used to facilitate interactions at conferences by allowing user participants to more conveniently find and replay important segments recorded during the conferences for emphasis, to enhance comprehension, or to otherwise instantly or subsequently review portions or all of the recordation selectively.

The present invention method, in addition to relying upon episode data for its table of contents, also automatically generates a media representation or icon which is a miniature graphical image of the video data such that differences of semantic interpretations are minimized.

The present invention method relies on the reliable and dependable response of a processor programmed to generate media representations which always correspond to the appropriate audio or video events. Moreover, the present embodiment permits semi-automatic annotation of video by allowing the user to merely highlight or block text to be annotated to video or audio via the graphical user interface.

In addition, the present invention overcomes the problem of an index containing spurious information from the data or missing important information from the data by employing an intelligent filtering agent to identify significant occurrences. The present invention overcomes the problem of insufficient throughput of processor systems to real time index, as distinguished from mere real time recording, video data.

Generally, the present invention performs the main steps of delineating episode data, generating media representations, generating a table of contents in real time, and presenting a table of contents by efficiently filtering input to the first processor(s) by delineating significant video data, audio data, event data, or metadata which is to be indexed.

The present invention organizes primary data in real time to make the information conveniently accessible through a graphical user interface. Real time is defined as a data processor system which processes input data immediately upon receipt such that any minimal delay of output data is immaterial to a human user or substantially imperceptible to a human user. Primary data encompasses audio-data, video-data, text data, combinations thereof, and any other form of data that can be in or converted to digital data. The present invention has a myriad of applications including facilitating conferences between users at remote locations, enhancing interaction between engineers during the design process, replaying news from live broadcasts, replaying political debates from live broadcasts, and previewing movies by viewing selected segments.

HARDWARE REQUIREMENTS

The hardware requirements for the present invention will vary depending upon whether the present invention is used to interpret primary data which is solely audio-data, solely visual-data, or audiovisual data. The hardware requirements will also vary depending upon the quantity of primary data and the desired quality of the presentation on the graphical user interface and audio interface. Generally, the present invention should be implemented by using a general purpose computer such as the Sun SPARC 10 with multiple processors. Alternatively, the present system can be implemented upon several general purpose computers in cooperative communication. The system can operate on a general computer having a single processor only where the quantity and quality of the primary data so permits. In an alternate embodiment, the system can also operate on computer architecture which supports a client-server network. For example, FIG. 6, discussed below, illustrates the information flow of the indexing system in a client-server network.

If the primary data contains video-data or audiovisual data, then the general computer must have sufficient memory, buffers, and processor capacity to manipulate a continuous input of video bitmaps, while reserving processor time and memory for other tasks in a windows system operating environment. The minimum hardware and processor requirements tend to increase proportionately in response to enhanced display resolution, increased number of colors featured on the display, increased duration of primary data to be processed, and concurrent processing of different types of primary data. Hence, the system's requirements for processors, memory buffers, random access memory (RAM), and storage disks may necessitate the upgrading of the general purpose computer with commercially available components. For example, commercially available disks with high capacities ranging in the gigabytes may be used to store digital primary data or derivations thereof. A 1.0 gigabyte disk is sufficient to store from 60 to 75 minutes of audiovisual data compressed in the JPEG format. Compression of audio and video data may be implemented by known software programs, or preferably by known firmware.

FIG. 1 illustrates an example of one possible hardware configuration for the present invention. The individual elements of the hardware disclosed configuration of FIG. 1 are well-known in the prior art. In addition, the elements in FIG. 1 are combined in a multiprocessor configuration which is well-known in the prior art. The hardware configuration of FIG. 1 is illustrated to emphasize the importance of selecting a hardware configuration to implement the present invention which is capable of real time processing continuous inputs of digital video and audio data. The hardware configuration of FIG. 1 will also facilitate the subsequent description of data manipulation in the detailed description of the present invention.

The first processor 10 can address memory locations in the first local random access memory 16, the first input memory buffer 18, the first rom 14, and the global random access memory 44. The direct memory access co-processor 13 can transfer data between global ram memory 44, first local random access memory (first local RAM) 16, or the database 26 and any input/output device located on the first local databus 38 without direct involvement of the first processor 10. Meanwhile, the second processor 12 can address memory locations in the second local random access memory 50, the second read only memory 52, and the global random access memory 44. Thus, the first processor 10 and the second processor 12 exchange data via global ram 44 under the supervision of the first bus controller 40 and the second bus controller 46. In sum, the system is configured such that the first processor 10 and the second processor 12 can simultaneously process data independently and such that the first processor 10 and the second processor 12 can share input and output data via the global ram 44.

Other improvements of the system are also adapted to process large amounts of data. For example, the graphics display controller 30 may contain a video processor and supplemental random access memory to increase the processing rate of video images. The hardware is configured for a graphical user interface 34 partially by the input/output ports 44 for the keyboard and mouse. The graphical user interface 34 includes the visual display device, a keyboard, and a pointing device such as a mouse. Select and other forms of the word used throughout the specification, where the context permits, refer to the user input of choosing an alternative presented on a display device by using a pointing device or keyboard.

The hardware configuration also features an impedance bridge 22 for matching the respective impedances of the first input memory buffer 18 and the second input memory buffer 20 to the impedance of the data source 36. The first input memory buffer 18 and second input memory buffer 20 allow the first processor 10 or the direct memory access co-processor 13 to retrieve data from the first input memory buffer 18 while the disk controller 24, with a supplementary processor, retrieves primary data 102 from the data source 36 via the second input memory buffer 20. The disk controller 24 stores the primary data 102 from the second input memory buffer 20 and derivations from the primary data 102. The database 26 must have a high storage capacity determined on the basis of the quantity and quality of the primary data 102 to be stored. The information stored in the database 26 is preferably stored in the form of objects. Computer languages such as Smalltalk of the Xerox Pal Alto Research Center allow the programmer to define objects. Objects may constitute tasks and processes or data elements and other representations of data. The programmer defines the way each object can communicate with other objects such that communication between object may be executed nonsequentially. The communication between objects allows processes to be executed.

DEFINITIONS FOR TYPES OF DATA

Figure 2:
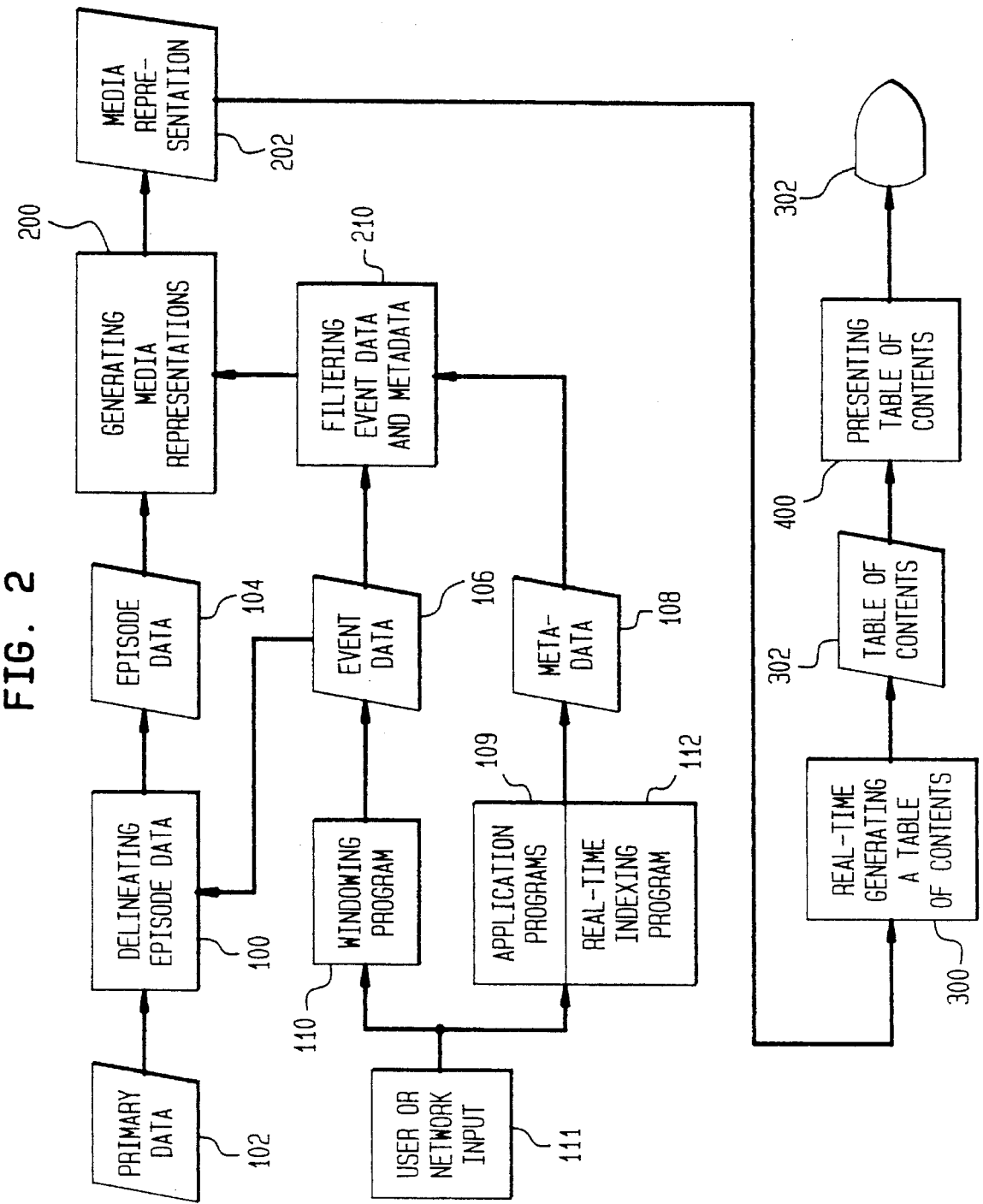
FIG. 2 shows the main steps involved in the method for operating a processor to index data according to the present invention.

Referring to FIG. 2, the present invention manipulates sundry types of data including primary data 102, episode data 104, event data 106, metadata 108, and media representations 202. Primary data 102 encompasses audio-data, video-data, text-data, and audiovisual data. Primary data 102 must be in a digital format before any processing can occur. For example, video primary data 102 can be converted from NTSC and format to JPEG digital format using commercially available equipment. Text data may be in ASCII format.

Episode data 104 includes a significant video image delineated from the primary data 102 based on significant scene changes, simultaneous changes in video and audio, or an audio recording representing a significant change in speakers. Episode data 104 also includes significant audio excerpts delineated from the primary data 102 based on speaker changes and other factors.

A media representation 202 may be a miniature graphical image of episode data 104 when the primary data is video-data. A media representation 202 may be a graphical image of the person speaking when the episode data 104 is solely audio-data. A media representation 202 may be a graphical, symbolic image representing notes from an application word processing program.

A media representation 202 is an icon displayed on the graphical user interface 34 in a window. A window refers to a work area or display area in a graphical user interface that respond to distinct user input. Windows are displayed through a windowing program 110 such as those known in the art or created by the able artisan. The media representation will differ depending upon whether the media representation was derived from an episode data 104, an event data 106, or a metadata 108. If the episode data 104 is video data., then the media representations 202 derived from episode data are a miniature graphical images. On the other hand, if the episode data 104 is audio information then, a media representation 202 derived from episode data 104 is a graphical, symbolic image of the person speaking when the primary data 102 is solely video-data.

A media representation 202 derived from event data 106 or metadata 108 can take virtually any form on the graphical user interface 34 or the audio interface 54. Event data 106 is a record created by the windowing program 110 in response to the user's input 111 or network input 111, the application programs 109, or external input. For example, event data 106 is generated in response to user input 111 when the user presses or releases a keyboard key, holds down a keyboard key, activates a window, updates a window, or presses a mouse button. Event data 106 may also be generated in response to the external input in the form of arrival of a predefined string at a serial or parallel port of the general purpose computer. Metadata 108 is control data generated by the application program 109, the real time indexing program 112 or the basic operating system such as UNIX.

Occurrences refer to the content of any type of data which is bounded by temporal constraints.

The first plurality of knowledge representations and the second plurality of knowledge representations contain instances of facts, knowledge and relationships between data elements which assist the processor in properly evaluating primary data 102, episode data 104, and media representations 202. The first plurality of knowledge representations may be expressed in the form of semantic networks, rule-based systems or frames. Semantic networks are an assembly of nodes which represent concepts, objects or data elements and links which characterize the relationship between the nodes. The thesaurus knowledge representation scheme is an example of semantic network. Object oriented programs are well suited for semantic networks because of the need for object oriented programs to inherit characteristics of connected nodes. The preferred embodiment of the invention utilizes a semantic network coupled with object oriented programming. However, the present invention may also be implemented using a rule-based system for knowledge representation which consists of a series of if-then statements.

Referring to FIG. 2, the main steps of the preferred embodiment are delineating episode data 100, generating media representations 200, real time generating of a table of contents 300 and presenting a table of contents 400.

DELINEATING EPISODE DATA

Delineating episode data 100 from primary data 102 differs depending upon whether audio-data, video-data, or audiovisual data is being processed. The delineating episode data step in block 100 is based upon executing procedures in cooperation with the plurality of first knowledge representations. The plurality of first knowledge representations is stored in the first local random access memory 16 and the global random access memory 44. The plurality of first knowledge representations contains relationships and may contain procedures which relate each episode data 104 to the primary data 102. The plurality of first knowledge representations enables the processor, or the first processor 10 and the second processor 12, to distinguish significant scene changes with respect to video data and speaker changes with respect to audio data. In the preferred embodiment, speaker changes are identified by known voice operated relay (VOR) circuitry used in conjunction with known digital logic circuitry to determine the principal floor speaker.

If the primary data 102 includes video-data, then the plurality of first knowledge representations are applied to the primary data 102 through blocks 120, 140, 160, 180 and others as illustrated in FIG. 3. If the primary data 102 includes audio-data or audiovisual data, then the plurality of first knowledge representations are applied through different routines.

Audio data is flagged as potential episode data 104 when a speaker change occurs. Additional filtering compares the potential audio episode data with prior audio episode data for a fixed time interval. If the audio spectral frequency components of the potential episode data deviate from the prior episode data by a fixed amount, then the potential audio episode data is bonafide episode data and is flagged as episode data 104.

With respect to the video data, the plurality of first knowledge representations contains information, and electively contains procedures, corresponding to the luminance values of any bitmaps which allow the processor, or the first processor 10 and the second processor 12, to distinguish scene changes. The plurality of first knowledge representations also contains information and possibly procedures to further filter the scene changes chosen according to luminance such that only significant scene changes are flagged as episode data 104. FIG. 3 shows how the plurality of first knowledge representations is applied to select episode data 104 from video-data as primary data 102. The registers, counters, and pointers referenced in FIG. 3 correspond to the following physical elements of computer hardware: the similar counter in block 116 and most counter in block 118 may be general purpose registers in the first processor 10 or the second processor 12. On the other hand, the similar and most counters may be located in the first local random access memory 16, the global random access memory 44, or the second local random access memory 50. The M pointer in block 118 and N pointer in block 113 are general purpose registers or a stack pointer.

As an alternative to delineating episode data 100 pursuant to FIG. 3, various known scene change algorithms can be utilized, which may be coupled with additional intelligent filtering as set forth in block 180 of FIG. 3.

In FIG. 3, the blocks illustrate the step of delineating episode data 100 pursuant to the preferred embodiment of the present invention. First, respective words M from bitmap N and corresponding words M from bitmap N+C are read into the data registers in block 114. As mentioned previously, the data registers are general purpose registers of the first processor 10 or second processor 12 for the temporary storage of data. C represents any positive integer less than the number of bitmaps received into the first input memory buffer 18. Second, in block 120, the data registers of block 114 are compared to see if the luminance characteristics of each words M are similar. If the luminance characteristics of the respective words M from bitmap N and the corresponding words M from bitmap N+C deviate from one another by approximately less than twenty percent (20%), then the respective words M from bitmap N and the corresponding words M from bitmap N+C are similar. Third, the similar counter in block 116 is incremented if the respective words M from bitmap N are sufficiently similar to the corresponding words from bitmap N+C. Fourth, the steps in blocks 114 and 120 are repeated via block 140 until a sufficient sample of the bitmap N and bitmap N+C are compared. A sufficient sample of the bitmap is bounded by allowable maximum degree of error in calculating the similarity between bitmap N and N+C at one extreme and available processing time of the first processor 10 and the second processor 12 at the other extreme. To conserve available processing time, the sufficient sample can be, but need not be, limited to a maximum of seventy percent (70%) of the words comprising bitmap N and bitmap N+C. Fifth, once a sufficient sample of the bitmap N and the bitmap N+C have been compared, then the block 160 determines whether a scene change has occurred by evaluating the value of the similar counter. If the bitmaps N and the bitmaps N+C are similar as determined by a minimum threshold value in the similar counter, then the similar counter is cleared, the most counter is cleared and the M pointer is set to 1 and the N pointer is incremented by C. The minimum threshold value in the similar counter correlates to the luminance characteristics of bitmap N and bitmap N+C deviating by less than twenty percent (20%). If the bitmaps N and bitmaps N+C are not similar, then the bitmaps are evaluated according to the block 180. Block 180 determines which video scene changes are most significant by evaluating the video scene changes in the light of simultaneous audio changes and video changes, changes in the colors of the bitmaps, and additional comparisons of bitmaps previously identified as different by block 180. If the bitmap N+C is sufficiently different from all bitmaps in a fixed prior time interval according to block 180, then bitmap N+C is flagged as episode data in block 115. Finally, in block 117 the episode data 104 is stored in the first local random access memory 16, local random access memory 50, or global random access memory 44 where the applications program 109 can access the episode data 104 for further tasks.

FILTERING EVENT DATA

Trivial event data must be distinguished from significant event data 106 (see FIG. 2). Media representations 202 will only be generated corresponding to significant event data 106 and significant metadata 108. For example, a media representation 202 should not be generated for every press of the mouse button on the graphical user interface 34. However, the user may want to generate a media representation 202 when a certain designated time has elapsed from when the user started his presentation.

Figure 4A:
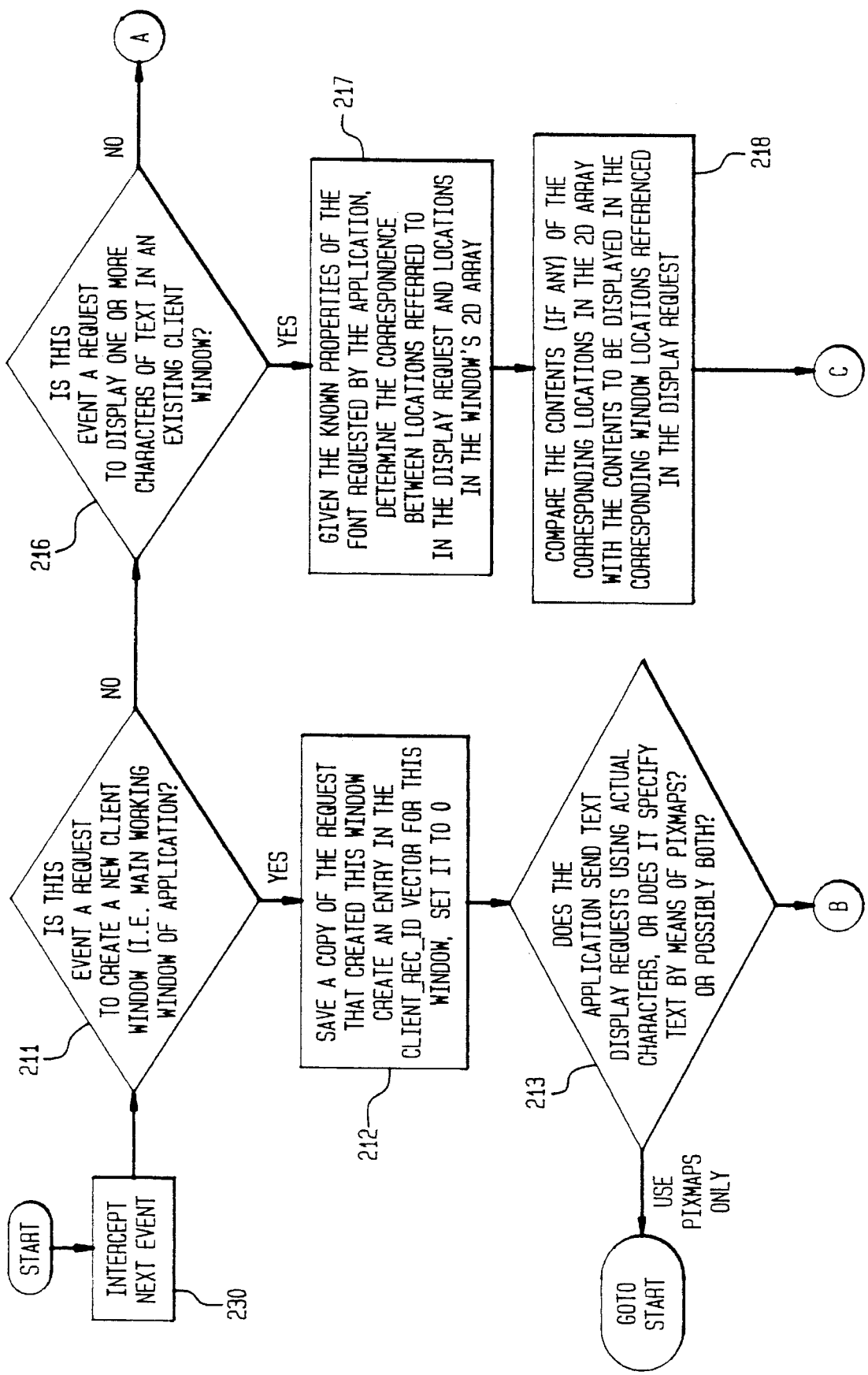
Figure 4B:
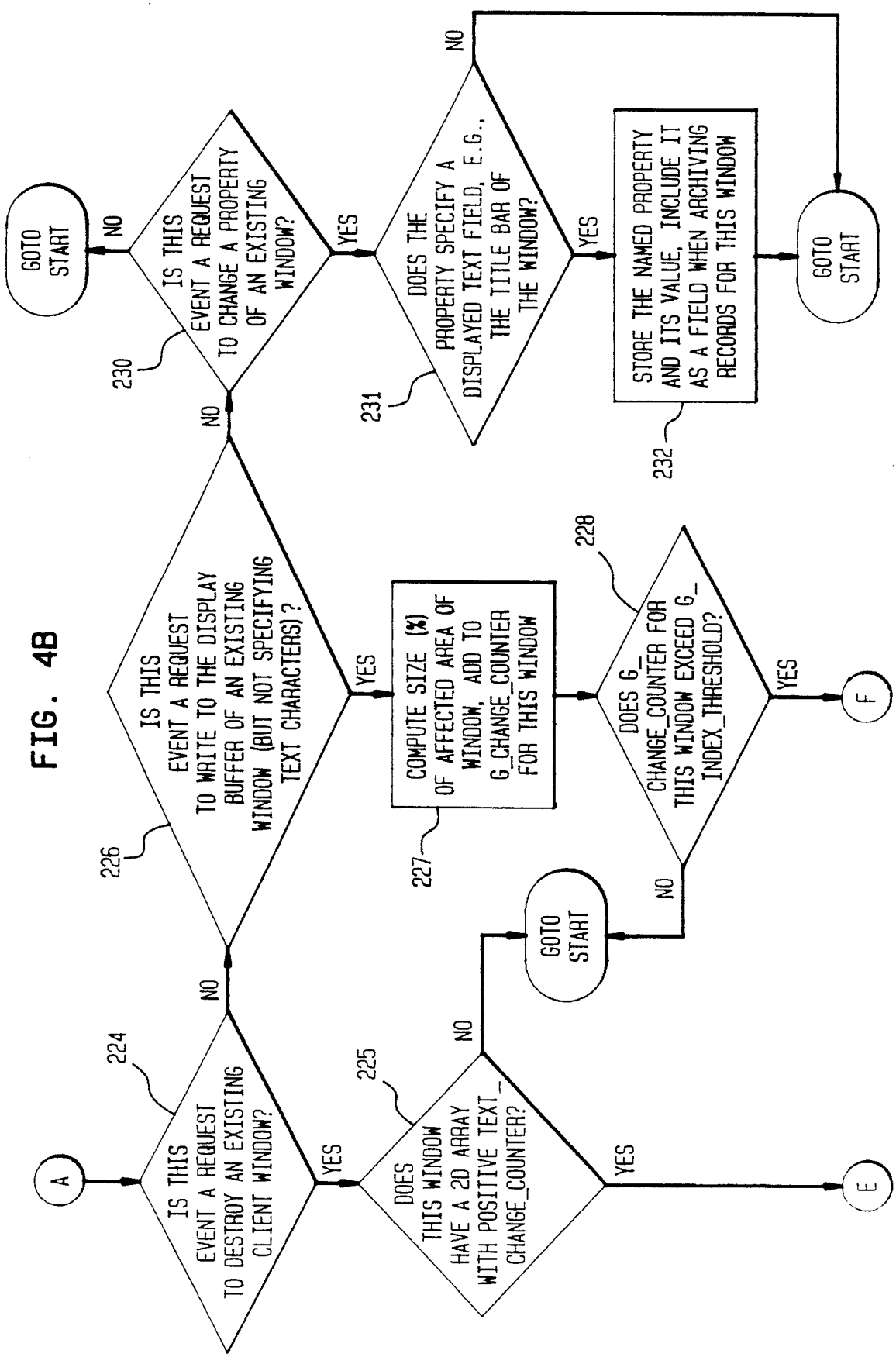
Figure 4C:
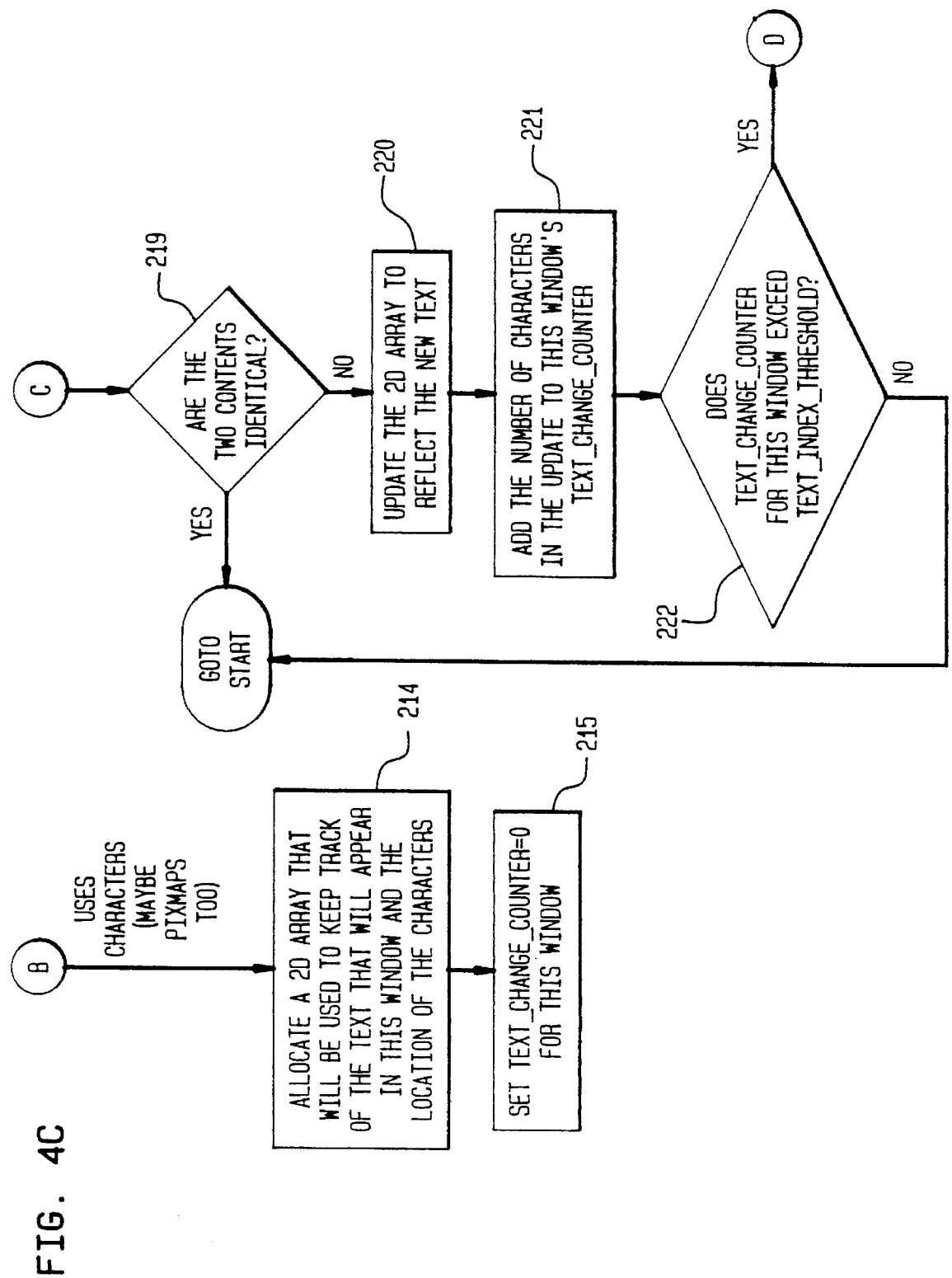

One means of filtering event data to obtain significant event data 106 is disclosed in FIG. 4. In this embodiment, event data 106 is intercepted in a block 230. A determination of whether this data represents a request to create a new client window (i.e. a main working window of application) is made in block 211. If it does, then a copy of the request that created this window is saved in block 212. Block 212 creates an entry in a Client_rec_id vector for this window, and sets it equal to zero. The Client_rec_id vector is an array window id. Each window has a unique id which is used to index into this vector. The id number of the last archived record is stored for each window in these locations. Next, a block 213 determines whether the application sends text display requests by using actual characters, pixmaps, or both. If it uses pixmaps only, than the application returns to start. If the application uses characters or a combination of characters and pixmaps, then block 214 allocates a 2D-array. This array keeps track of the text that appears in this window and the location of the characters. The 2D-array functions when a request is made to display character "C" at location X,Y in the window, the type of font requested will always be known. Therefore, the number of pixels the display C requires and the number cells (n) in the 2D-array C needs to maintain the correspondence with the real window will also be known. When C is entered at X,Y in the array, the 2D-array cells—X+1, Y ... X+(n−1), Y-will be tagged with a special non-displayable character or code. Comparing a string S with the contents of the 2D-array begins at a starting location in the array which is given by the display request. The first character of the 2D-array is compared to the first character in S. If they are equal, the font sizes are compared. The font sizes of S are known, and the font sizes of the 2D-array are determined by counting the number of special characters that follow the given character.

Following the allocation of the 2D array, a block 215 will set Text_Change_Counter variable to zero for this window. The Text_Change_Counter is a local variable for each window which keeps track of the number of characters added/changed since the last text was archived for this window.

If event data 106 does not represent a request to create a new client window, then a determination is made in a block 216 to display one or more characters of text in an existing client window. If the determination is affirmative, than a block 217 determines the correspondence between locations referred to in the display request and locations and locations in the window's 2D array given the known properties of the font requested by the application. Following this determination, block 218 compares the contents (if any) of the corresponding locations in the 2D array with the contents to be displayed in the corresponding window locations referenced in the display request. A decision is made whether the two contents are identical in block 219. If they are, then the application returns to start. If they are not, then a block 220 updates the 2D array to reflect the new text. Following this update, a block 221 adds the number of characters in the update to this window's Text_Change_Counter. A decision is then made in block 222 whether Text_Change_Counter for this window exceeds $Text_{13}$ $Index_{13}$ Threshold. $Text_{13}$ $Index_{13}$ Threshold refers to an integer which specifies the number of characters that must be added or changed in a window before indexing takes place. If Text_Change_Counter is not excessive, then the application returns to start. However, if it is, then a block 223 archives the contents of the 2D array, indexes them, and creates a request for this window as a field in the archived record. If the application includes other displays besides text (graphics or pixmaps), block 223 sends a pseudo redisplay message (a detailed description of the pseudo redisplay message request is given below). It also captures the window's resulting display requests and includes them in the archived record, and includes a list of current records-ids for all members of Client_rec_id vector as a field in the archived record. Block 223 then changes the entry for this window in Clients_rec_id to the id of this archived record. Finally, block 223 sets Text_change_counter to zero for this window.

If block 216 determines not to display one or more characters of text in an existing client window, then a block 224 determines whether the event is a request to destroy an existing client window. If so, then a block 225 determines whether this window has a 2D array with a positive Text_Change_Counter. If so, then the information is managed by block 223 as described above. If not, the application returns to start.

If block 224 determines that this event is not a request to destroy an existing client window, then a block 226 determines whether this event is a request to write to the display buffer of an existing window. If it is, then a block 227 computes the size (%) of the affected area of the window, and adds it to a G_Change_Counter for this window. The G_Change_Counter is a local variable for each window that keeps track of the percentage of the window affected by draw commands since the last graphics were archived for the window. Following this step, a block 228 determines whether G_Change_Counter for this window exceeds a G_Index_Threshold variable. The G_Index_Threshold variable refers an integer which specifies the percentage of the window affected by draw commands before indexing takes place. If G_Change_Counter is not excessive, then the application returns to start. However, if it is excessive, then a block 229 sends the window a pseudo redisplay message, captures the window's resulting display requests, and includes them in the archived record. Block 229 also includes a list of current records-ids for all members of Client_rec_id vector as a field in the archived record. Block 229 then changes the entry for this window in Clients_rec_id to the id of this archived record. Next, Block 229 sets Text_change_counter to zero for this window. Finally, block 229 includes the create request for this window as a field in the archived record. Following block 229, the application returns to start.

If block 226 determines that this event is not a request to write to the display buffer of an existing window, then a block 230 determines whether this event is a request to change a property of an existing window. If not, the application returns to start. If so, then a decision is made in a block 231 whether the property specifies a displayed text field; e.g., the title bar of the window. If it does not, the application returns to start. If the property does specify a displayed text field, then a block 232 stores the named property and its value, and includes it as a field when archiving records for this window. Following this step, the application returns to start.

A Pseudo-Redisplay request is a request sent by the window server or manager to a client asking it to redraw itself. In this case, however, the resulting client requests are not actually executed but are simply intercepted by the indexing program to be part of the archive. This pseudo request is not part of the existing window protocol, but could easily be integrated into it. The functionality of the pseudo-redisplay request during retrieval and playback time begins when a user issues a query. The system will return zero or more pointers or headers of potentially relevant archived records depending upon the indexing and retrieval methods employed. The user then selects one the these records for replay. The retrieved record contains 1) the necessary request for generating the window, 2) all the text that was displayed in it at a certain point of time, and 3) a list of Client records in the archive that represents the closest prior archived state of other windows that were copresent with this window at or near the time this record was archived. Given the text and the window, it is trivial to automatically generate requests that will display the text in the window. To duplicate the environment at the time the record was archived, the system retrieves the records in this list form the archive and executes the necessary creation and display requests.

"Animation" of a window, i.e., playing back their appearance over a time segment can be archived using this algorithm by storing time-stamped lists of display requests with each archived record. At playback time, one merely executes the creation and display requests in the chronological ordering determined by the time-stamps.

GENERATING MEDIA REPRESENTATIONS

Generating media representations 200 differ depending upon whether episode audio-data or episode visual-data is being processed. Generating media representations 200 differ depending upon whether media representations 202 are derived from episode data 104 as opposed to event data 106 or metadata 108. The plurality of second knowledge representations contains relationships and may contain procedures which relate respective ones of episode data 104 to corresponding ones of media representations 202, respective ones of event data 106 to corresponding ones of media representations 202, and respective ones of metadata 108 to corresponding ones of media representations 202. The media representation 202 corresponding to an event datum 106 may be generic for the event or the plurality of second knowledge representations may establish the icon display information about the event based on information other than identity of the event.

REAL TIME GENERATING OF A TABLE OF CONTENTS

The next main step in the process is the generating of a table of contents in real time. Windows are created in a windows operating environment according to well-known methods. The windows are configured to contain media representations 202 in an organized fashion.

PRESENTATION OF THE TABLE OF CONTENTS

The next main step in the process is the presentation of the table of contents 400. One possible embodiment of the table of contents 302 is presented as illustrated in FIG. 5. There is a parent window 105 which encompasses the entire background of the display. On the top left is the primary data window 102, on the bottom is a series of smaller windows called descendent windows 103, which contain the media representations 202.

The windows are displayed in the usual manner using a windowing program 110. Windowing programs 110, allow the programmer great flexibility in the appearance of the final program. However, as the media representations 202 progress through a sequence of time, only a limited number of media representations 202 can be displayed in sibling or descendent windows 103. Thus, the presentation of the table of contents 400 involves a continuous updating of media representations 202 in the descendent windows 103 or sibling windows with the media representations 202 most recently created from episode data 104, event data 106, or metadata 108. The earlier media representations 202 may be stored in the first local random access memory 16, the second local random access memory 50, or the global random access memory 44, via the real time indexing program 112, in video supplemental random access memory via the windowing program 110, or in the database 26 via the application program 109 or the real time indexing program 112. Storage and quick retrieval of these media representations 202 is desirable to preserve the sequence of occurrences of video images in a presentation or video. By default the descendent windows 103 will display the most recent media representations 202. However, the user may scroll through the entire sequence of media representations 202 which are stored in the first local random access memory 16, the second local random access memory 50, the global random access memory 44, or the database 26.

ANNOTATING WITH ANCILLARY DATA

The present invention also allows users to annotate episode data by appending ancillary data to the episode data. Ancillary data is data which the user manually inputs by a keyboard or which is semi-automatically input by a user highlighting or blocking a segment of preexisting text. Ancillary data may constitute notes generated by the user or may constitute excerpts of text from documents presented in a window during the conference. Respective ones of ancillary data are associated with corresponding ones of episode data 104 to facilitate retrieval.

To accomplish semi-automatic annotation, the means for annotating any episode data 104 encompasses a plurality of third knowledge representations to understand the significance of highlighting text data in the application program 109 document. Alternatively, the application program 109 could be modified to send real time notification and information concerning the highlighting of text data to the real time indexing program 112. The application program 109 may communicate with the real time indexing program 112 via standard protocols or via the application program protocol.

The following example explains how ancillary data may be used to annotate video data or audio data. If the user blocks text in a word processing program during a conference, then a particular event data called event data Z is created. Event data Z is associated with episode data 104 that is the closest in time to when the blocking occurred. Referring to FIG. 2, the semi-automatic annotation process is represented by the arrow showing data flow from block 106 to block 100. The resulting appended episode data from the process is useful for searching the video data or audio data content of multiple conferences.

ALTERNATIVE EMBODIMENT, CLIENT-SERVER NETWORK

Figure 6:
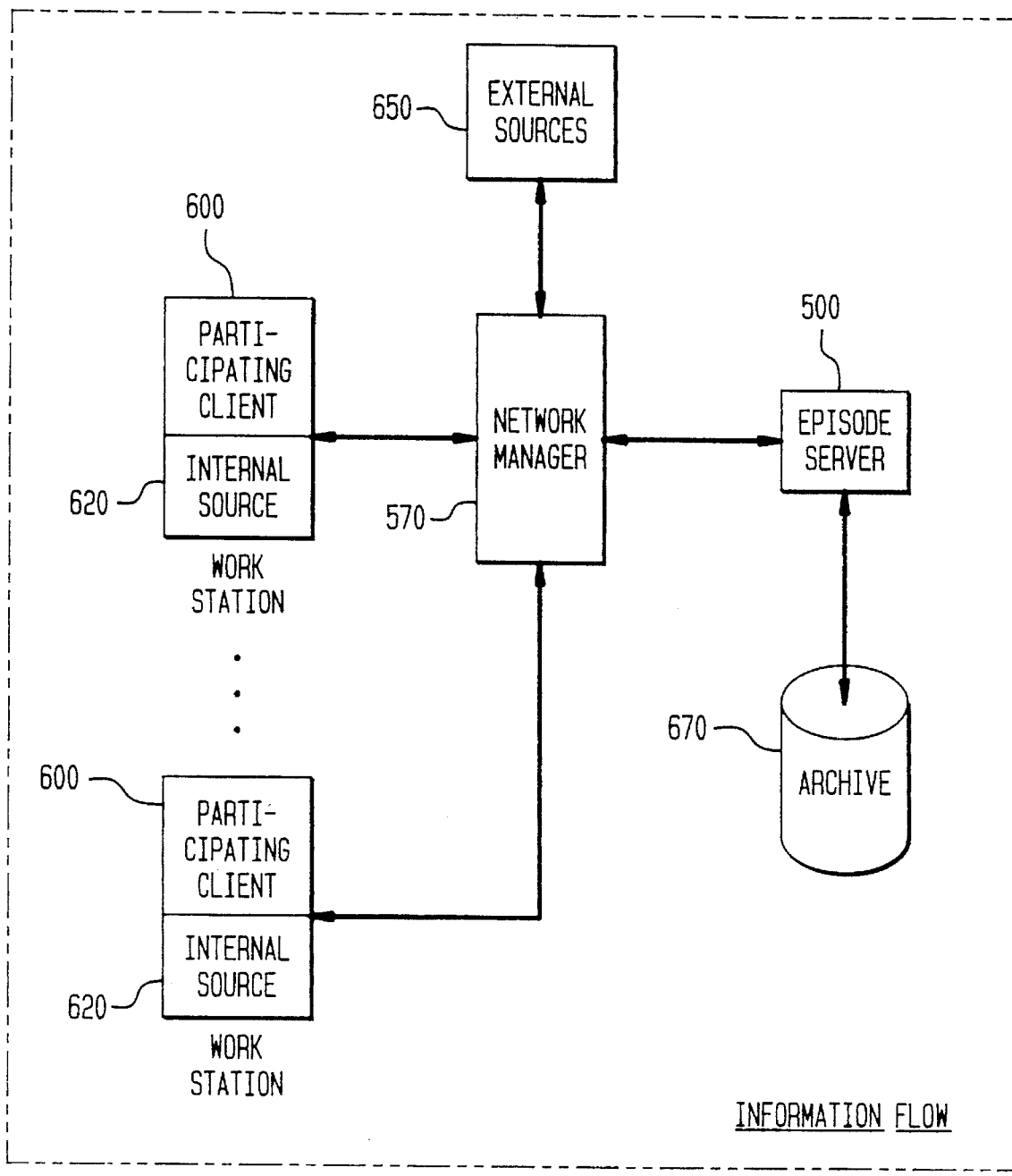
FIG. 6 shows an alternative embodiment of the present invention showing information flow in a client server network.

The alternative embodiment in FIG. 6 illustrates the present invention implemented in a client-server network and the associated information flow in said client server network.

The alternate embodiment consists of an episode server 500, a network manager 570, a plurality of participating clients 600, internal sources 620, external sources 650, and an archive 670.

The episode server 500 controls the network manager 570, the input of primary data 102 from the external sources 650, the storing and retrieval of primary data 102 and derivations thereof in the archive 670, and the creation-manipulation of windows on the graphical user interface of participating clients 600.

The participating clients 600 use the facilities provided by the episode server 500. The participating clients 600 are work stations which support a graphical user interface. The participating clients 600 and the episode server 500 communicate via a network manager 570.

The network manager 570 may encompass network protocols such as TCP/IP, DECnet and Chaos. Each participating client 600 may, but is not required to, request the episode server 500 to perform tasks. The network manager 570 will place the participating clients 600 in queue until the episode server 500 can service the participating client's request. Alternatively, the network manager 570 may poll the participating clients 600 for data. The network manager 570 provides communication, switching and control functions between ones of the participating clients 600 and the episode server 500; between ones of the external sources 650 and the episode server 500; between ones of the internal sources 620 and the episode server 500; and between ones of the participating clients 600. The network manager 570 also controls timing to prevent data from colliding.

The archive 670 is attached to the episode server 500. The archive 670 is a high-capacity storage disk which stores the index assembly, which includes episode data 104, table of contents 302, media representations 202, ancillary data, and other common files for all of the participating clients 600 in the system.

Internal sources encompasses sources of metadata 108 and event data 106. Thus, internal data refers to both metadata 108 and event data 106. External sources include sources of primary data 102 as well as metadata 108 and event data 106 from other interconnected networks. Thus, external data encompasses primary data 102 as well as metadata 108 from other interconnected networks and event data 106 from other interconnected networks.

The client-server network illustrated in FIG. 6 may be implemented using window software and computer architecture which is generally known.

Figure 7:
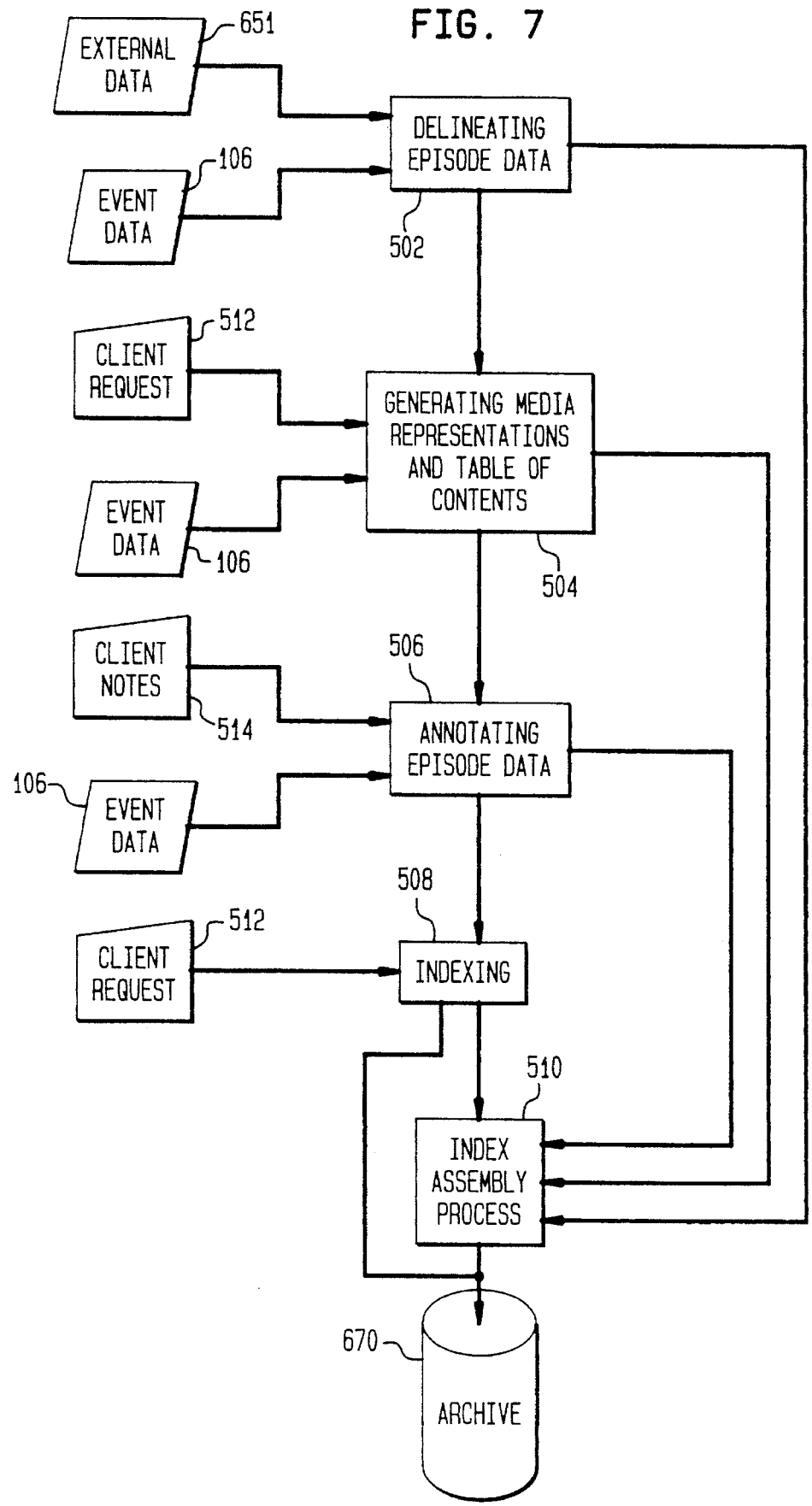
FIG. 7 shows an alternative embodiment of the present invention showing the information flow associated with the means for storing data of the episode server.
Figure 8:
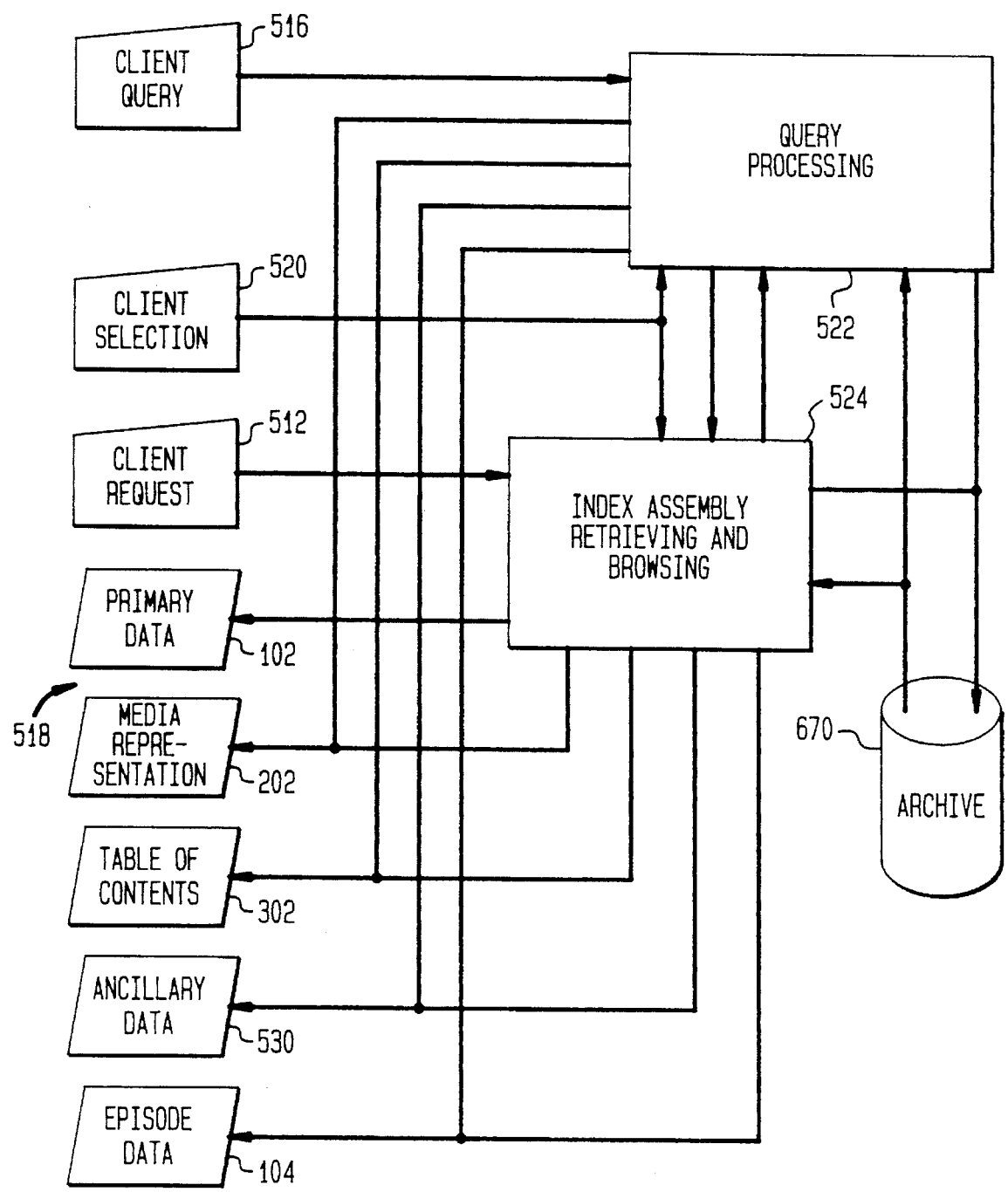
FIG. 8 shows an alternative embodiment of the present invention showing the information flow associated with the means for retrieving data of the episode server.

The episode server 500 performs functions which may be divided into two main categories: (1) Means for storing data as illustrated in FIG. 7, and (2) Means for retrieving data as illustrated in FIG. 8.

MEANS FOR STORING DATA

Means for storing data include operating the episode server 500 to accomplish the following storage functions: delineating episode data 502, generating media representations 504, real time generating of a table of contents 504, annotating episode data 506 and indexing 508 based on the ancillary data 530. Delineating episode data 502 is based on the input of external data 651 and the input of event data 106. After episode data 104 is delineated pursuant to the details discussed in the preferred embodiment, the output is organized in the index assembly process of block 510 in a suitable manner for storage in the archive 670.

Generating media representations 504 and real time generating of a table of contents 504 is based on the input of client requests 512, event data 106 and episode data 104. Client requests 512 are a request from a user to influence a step or an entire process pursuant to a finite number of permissible alternatives. The output of the generating media representation 504 and real time generating of a table of contents 504 is organized in the index assembly process of block 510 in a suitable manner for storage in the archive 670. In addition, the output of generating media representations 504 and real time generating of a table of contents 504 is routed to the annotating episode data process in block 506.

The annotating process in block 506 accepts client notes 514, event data 106, media representations 202, and the table of contents 302 as input. Client notes 514 are ancillary data 530 which is entered by manually typing characters into the keyboard or by semi-automatically highlighting a textual entry with a pointing device. The annotating process in block 506 feeds its output into the index assembly process 510 which organizes the index assembly in proper form for storage in the archive 670. In addition, the annotating process 506 output is routed to the indexing process 508.

The indexing process 508 allows media representations 202 to be sorted by ancillary data 530. The input of the indexing process are episode data 104 with appended ancillary data from block 506 and client requests 512. The output of indexing in block 508 is fed directly into the archive 670 or is fed indirectly into the archive via the index assembly process in block 510.

MEANS FOR RETRIEVING DATA

Means for retrieving data are illustrated in FIG. 8. Means for retrieving data include operating the episode server 500 to retrieve data such that query processing 522 and index assembly retrieval and browsing 524 may occur. Query processing 522 is initiated by the input of a client query 516. The information being queried can be stored to facilitate retrieval by using a variety of known methods such as by using inverted files. The information in the table of contents 302 is able to be queried as well as other information contained in the archive 670. In response to a user entering a client query 516, the episode server 500 will identify one or more relevant media representations 202 and display the relevant media representations 202 for the user on the graphical user interface of the participating client 600. The user may then make a client selection 520 to view the corresponding episode data 104.

Index assembly retrieval and browsing process in block 524 allows the user to select index assembly output 518 in the form of replays of the primary data 102, presentations of media representations 202, presentations of table of contents 302 displays, and presentation ancillary data 530 displays via client requests 512 and client selections 520 as input. The episode server 500 will access the appropriate record for the user in the archive 670 and display the record as output on a participating client's graphical user interface. Moreover, the episode server 500 distinguishes windowing protocols that describe window configuration (i.e. geometry, background, color) from the windowing messages that describe the contents of the window such that episode data 104 may be replayed independently via client requests 512 and client selection 520 as input to the episode server 500.

Obviously, numerous modifications and variations of the present invention are possible in light of the above teachings. It is, therefore, understood that within the scope of the appended claims, the invention may be practiced otherwise than as specifically described herein.

What is claimed is:

1. A method of operating a data processor to index data for at least one user comprising the computer-implemented steps of:

receiving primary data from a data source, the primary data consisting of audio-data and audiovisual-data that has been converted to a sequence of binary words;

delineating a plurality of episode data from the primary data, each one of said plurality of episode data being at least one word of said sequence of binary words, said each one of said plurality of episode data being stored in memory, wherein said delineating includes comparing and filtering audio spectral frequency components in said audio-data and audiovisual-data in the primary data;

generating a plurality of icons, to correspond with said plurality of episode data;

generating a table of contents as said primary data is being received by configuring said plurality of icons in an organized fashion;

presenting the table of contents to said at least one user on at least one display device, the table of contents permitting said at least one user to select one of said plurality of icons to replay the corresponding one of said plurality of episode data.

2. The method of operating a data processor to index data according to claim 1 wherein said sequence of binary words has at least one identifiable word, said at least one identifiable word being within the primary data received during a discrete, identifiable time interval; and all steps following the step of receiving the primary data from said data source are executed immediately after said at least one identifiable word is received such that said one of said plurality of icons derived from said one of said plurality of episode data is presented to said at least one user immediately after said at least one identifiable word is received.

3. The method of operating a data processor to index data according to claim 1 wherein the step of generating said plurality of icons comprises the step of executing procedures and relationships that relate respective ones of said plurality of episode data with ones of said plurality of icons via a plurality of first knowledge representations.

4. The method of operating a data processor to index data according to claim 1 further comprising step of storing said plurality of icons in a database.

5. The method of operating a data processor to index data according to claim 1 further comprising the steps of:
   presenting the primary data on at least one display device selected from the group consisting of audio interfaces, graphical user interfaces, visual display devices, and audiovisual display devices; and
   storing the primary data in a database.

6. The method of operating a data processor to index data according to claim 1 further comprising the steps of:
   retrieving selective ones of said plurality of episode data by selecting corresponding ones of said plurality of icons;
   inputting at least one ancillary data by said at least one user to annotate the selected one of said plurality of episode data that the user retrieved;
   presenting the at least one ancillary data to a user;
   storing the at least one ancillary data in a database such that the at least one ancillary data is appended to the selected one of said plurality of episode data that was retrieved;
   indexing the at least one ancillary data such that each of the at least one ancillary data has a first ancillary address stored in the database; and
   retrieving the at least one ancillary data such that the at least one
   ancillary data is presented to said user.

7. The method of operating a data processor to index data according to claim 6 further comprising the steps of:
   sorting the at least one ancillary data by using input values selected by a user and by using intrinsic values of the at least one ancillary data as sorting criteria;
   generating a second ancillary address corresponding to the sorted at least one ancillary data, the second ancillary address being stored in the database; and
   displaying the sorted at least one ancillary data on a display device by using the second ancillary address.

8. The method of operating a data processor to index data according to claim 7 further comprising the steps of:
   sorting the plurality of episode data by sorting respective ones of at least one ancillary data that were appended to the corresponding ones of said plurality of episode data in claim 6.

9. The method of operating a data processor to index data according to claim 1 further comprising the steps of:
   allowing a user to input ancillary data to annotate one of the plurality of episode data that occur red with said user's input of ancillary data;
   presenting the at least one ancillary data to said user; and
   storing the at least one ancillary data such that the at least one ancillary data is appended to said one of said plurality of episode data that was retrieved.

10. The method of operating a data processor to index data according to claim 1 further comprising the steps of:
    permitting a user to select one of said plurality of episode data by inputting corresponding ones of a plurality of icon values, each one of said plurality of icons having a designated one of said plurality of icon values; and
    displaying said one of said plurality of episode data that the user selected on a display device.

11. The method of operating a data processor to index data according to claim 1 wherein the step of delineating said plurality of episode data is further performed periodically at predetermined time intervals by comparing and filtering luminance values of bitmaps in said audiovisual-data in the primary data to previously filtered prior bitmaps in the plurality of episode data to determine whether the subsequent bitmaps differ more than 20% to constitute episode data.

12. The method of operating a data processor to index data according to index data according to claim 11 wherein the step of delineating said plurality of episode data is accomplished in response to correlating changes in said audio data in the primary data, and changes in luminance values of bitmaps in said audiovisual data in the primary data.

13. The method of operating a data processor to index data according to claim 1 wherein the step of delineating said plurality of episode data is further accomplished by comparing a plurality of color values of bitmaps in said audiovisual data in the primary data and wherein delineating said plurality of episode data is performed periodically at a variable rate based upon feedback of the processor concerning available memory and memory utilization.

14. The method of operating a data processor to index data according to claim 1 wherein the step of generating is performed by generating an icon such that said icon is a miniature graphical image of at least one episode data of the plurality of episode data.

15. A data processor system for indexing data comprising:
    a receiver, the receiver capable of demodulating a primary data signal consisting of audio-data and audiovisual-data to obtain primary data, the receiver having a memory buffer selected from the group of first input memory buffers and second input memory buffers to store the primary data in digital form, the primary data consisting of at least one sequence of binary words;
    a plurality of episode data, each one of said plurality of episode data being at least one binary word of the at least one sequence of binary words;
    a plurality of first knowledge representations relating the plurality of episode data to the primary data;
    a plurality of second knowledge representations relating respective ones of a plurality of icons with corresponding ones of said plurality of episode data;
    a processor selected from the group of first processor, second processor, and first and second processor considered collectively to generate each of said plurality of icons from any given one of said plurality of episode data, from the plurality of episode data, based on said second knowledge representations, and to generate each one of said plurality of episode data from any given primary data based on said first knowledge representations, wherein said generating includes comparing and filtering audio spectral frequency components in said studio-data and audiovisual-data in the primary data; and
    a means for real time generating of a table of contents with respect to receiving and storing said primary data from the plurality of episode data and from the plurality of icons.

16. The system according to claim 15 further comprising a means for selecting respective ones of said plurality of icons such that a user may display corresponding ones of said plurality of episode data.

17. The system according to claim 15 further comprising means for presenting primary data to a user before the primary data is stored.

18. The system according to claim 15 further comprising means for detecting and delineating a plurality of episode data from the primary data.

19. The system according to claim 15 further comprising means for generating said plurality of icons and means for associating respective ones of said plurality of episode data with corresponding ones of said plurality of icons.

20. The system according to claim 15 further comprising means for storing a table of contents of the plurality of episode data and said plurality of icons.

21. The system according to claim 15 further comprising means for presenting said plurality of icons to the user as said plurality of icons are being formed.

22. The system according to claim 15 further comprising means for retrieving any one of said plurality of icons from memory and displaying any one of said plurality of icons.

23. The system according to claim 15 further comprising means for annotating any one of said plurality of episode data with at least one ancillary data.

24. The system according to claim 15 further comprising means for indexing and sorting said episode data by using the at least one ancillary data as sorting criteria.

25. The system according to claim 15 further comprising means for identifying, selecting, and presenting any one of said plurality of episode data immediately after the primary data relating to said one of said plurality of episode data has been received.

26. A multimedia conferencing system comprising:

a plurality of participating clients, the plurality of participating clients being work stations, the work stations supporting a graphical user interface;

external sources, the external sources having external data, external data including primary data, metadata and events consisting of audio-data and audiovisual data in digital form from other networks;

internal sources, the internal sources encompassing local sources of metadata and event data, an episode server, the episode server having a means for storing data, said means for storing data responsive to input of external data, event data, client requests or client notes, the episode server having a means for retrieving data, said means for retrieving data being responsive to input of a client query, clients selection or client request, said means for storing data including delineating episode data by executing procedures in conjunctions with a plurality of first knowledge representations and the episode server having a means for generating a plurality of icons in real time and a table of contents in real time with respect to storing and retrieving data, wherein said procedures include comparing and filtering audio spectral frequency components in said audio-data and audiovisual data in the external data;

a network manager, the network manager being operably, electrically connected to said episode server, said external sources and said participating clients, the network manager having a means for providing communication, switching and control function between ones of said plurality of participating clients and the episode server, between ones of the participating clients, between the external sources and the episode server, and between the internal sources and the episode server; and an archive, the archive operably attached to the episode server, the archive being a high-capacity storage device for storing the episode data, and for storing other common files for the plurality of participating clients.

27. The multimedia conferencing system of claim 26 wherein the plurality of first knowledge representations contain knowledge concerning luminance values of bitmaps, correlation of simultaneous changes in audio and video and color of bitmaps.

28. The multimedia conferencing system according to claim 26 wherein the means for storing data include storing data such that annotating of episode data occurs in response to said client notes and said event data, and such that indexing occurs in response to said client request.

29. The multimedia conferencing system according to claim 26 wherein the means for retrieving data include retrieving data such that primary data, said plurality of icons, table of contents, ancillary data, and episode data are retrieved from the archive in response to said client query, said client selection or said client request.

* * * * *